(12) United States Patent
Rangaprasad et al.

(10) Patent No.: US 11,955,099 B2
(45) Date of Patent: Apr. 9, 2024

(54) COLOR CORRECTION BASED ON PERCEPTUAL CRITERIA AND AMBIENT LIGHT CHROMATICITY

(71) Applicant: Apple Inc., Cupertino, CA (US)

(72) Inventors: Arun Srivatsan Rangaprasad, Sunnyvale, CA (US); Anselm Grundhoefer, Campbell, CA (US)

( * ) Notice: Subject to any disclaimer, the term of this patent is extended or adjusted under 35 U.S.C. 154(b) by 0 days.

(21) Appl. No.: 18/099,436

(22) Filed: Jan. 20, 2023

(65) Prior Publication Data

US 2023/0298541 A1    Sep. 21, 2023

Related U.S. Application Data

(63) Continuation of application No. PCT/US2021/038099, filed on Jun. 18, 2021.

(60) Provisional application No. 63/054,738, filed on Jul. 21, 2020.

(51) Int. Cl.
G09G 5/02    (2006.01)
G06V 10/60    (2022.01)

(52) U.S. Cl.
CPC .............. *G09G 5/02* (2013.01); *G06V 10/60* (2022.01); *G09G 2360/144* (2013.01)

(58) Field of Classification Search
CPC ..... G09G 5/02; G09G 2360/144; G06V 10/60
See application file for complete search history.

(56) References Cited

U.S. PATENT DOCUMENTS

| | | | |
|---|---|---|---|
| 2017/0103729 A1* | 4/2017 | Huang | G06T 5/008 |
| 2018/0268754 A1* | 9/2018 | Kim | G09G 3/2011 |
| 2019/0094554 A1* | 3/2019 | Benesh | G06T 11/001 |

FOREIGN PATENT DOCUMENTS

| | | |
|---|---|---|
| KR | 20180120470 A | 11/2018 |
| KR | 20190027131 A | 3/2019 |

OTHER PUBLICATIONS

International Search Report and Written Opinion mailed Oct. 14, 2021, PCT International Application No. PCT/US2021/038099, pp. 1-11.

* cited by examiner

*Primary Examiner* — Deeprose Subedi
(74) *Attorney, Agent, or Firm* — Fernando & Partners, LLP

(57) ABSTRACT

Various implementations disclosed herein include methods, electronic devices, and systems for performing perceptual-based color correction based on chromaticity values. To that end, in some implementations, a method is performed at an electronic device with one or more processors, a non-transitory memory, and a see-through display. The method includes determining a chromaticity value associated with ambient light from a physical environment. The chromaticity value quantifies the ambient light. The method includes determining a set of color correction values based on a function of the chromaticity value and image data. The set of color correction values and the chromaticity value together satisfy one or more perceptual criteria. The method includes modifying the image data in order to generate display data based on a function of the set of color correction values. The method includes displaying the display data on the see-through display.

20 Claims, 13 Drawing Sheets

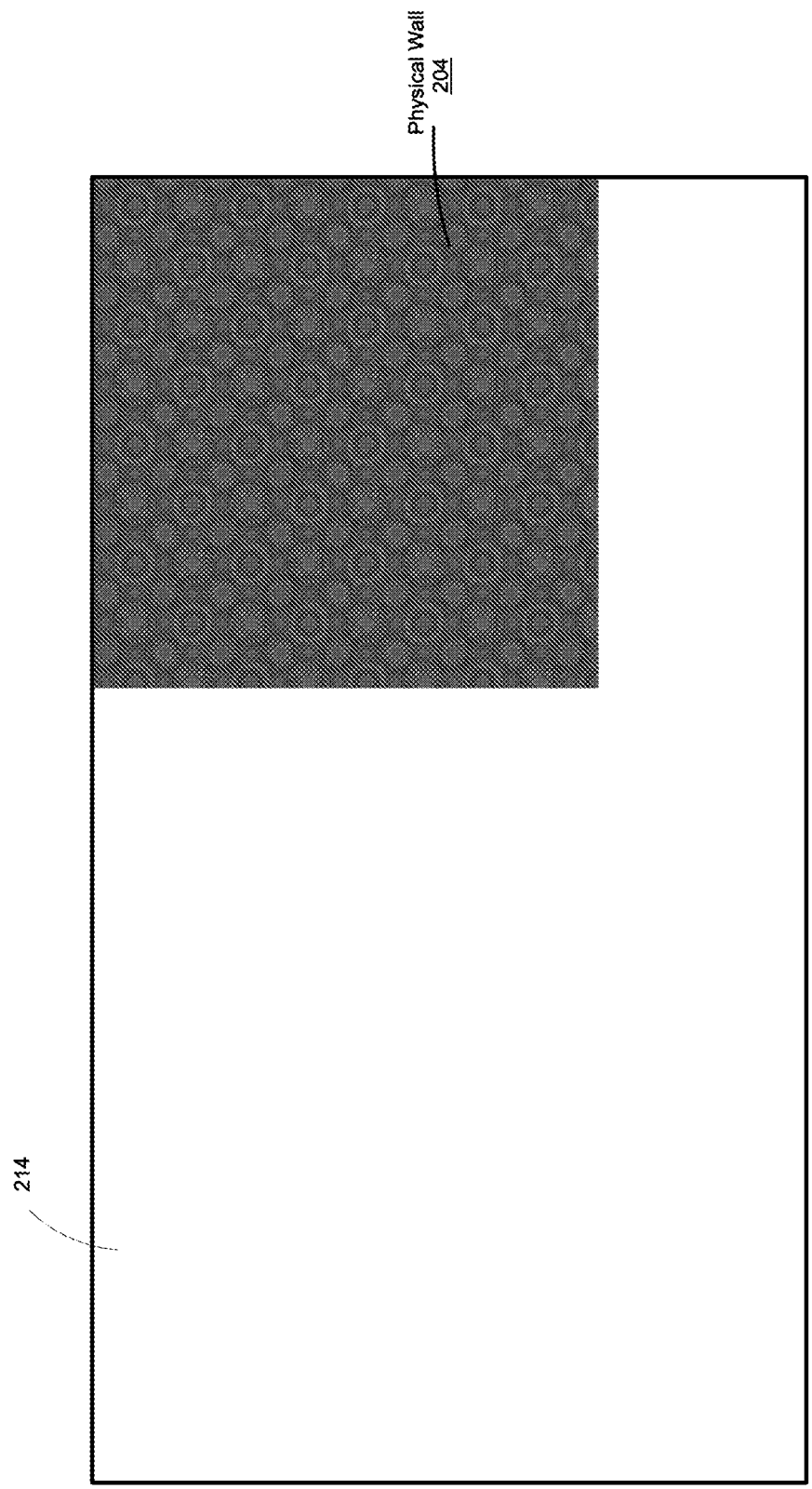

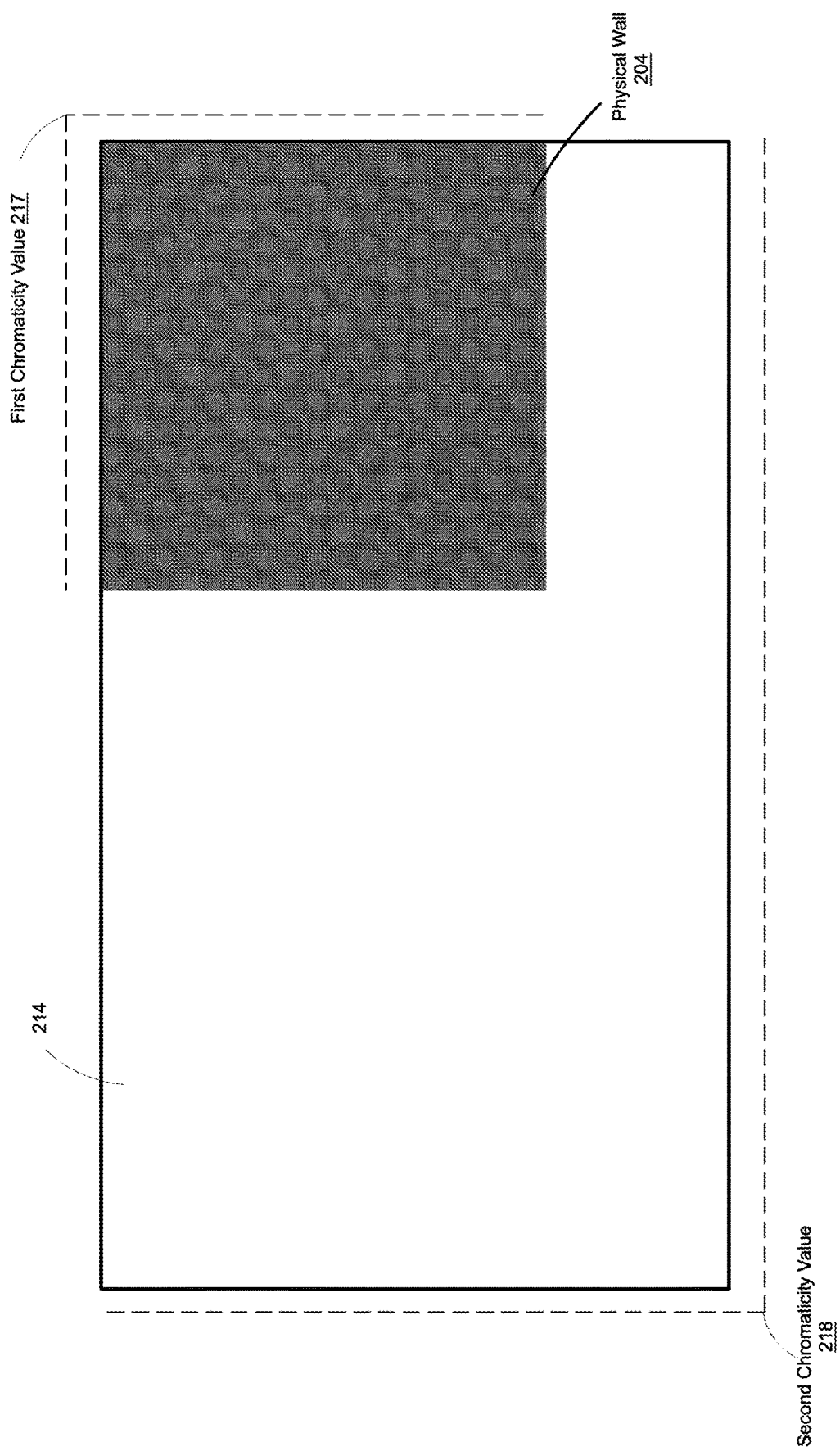

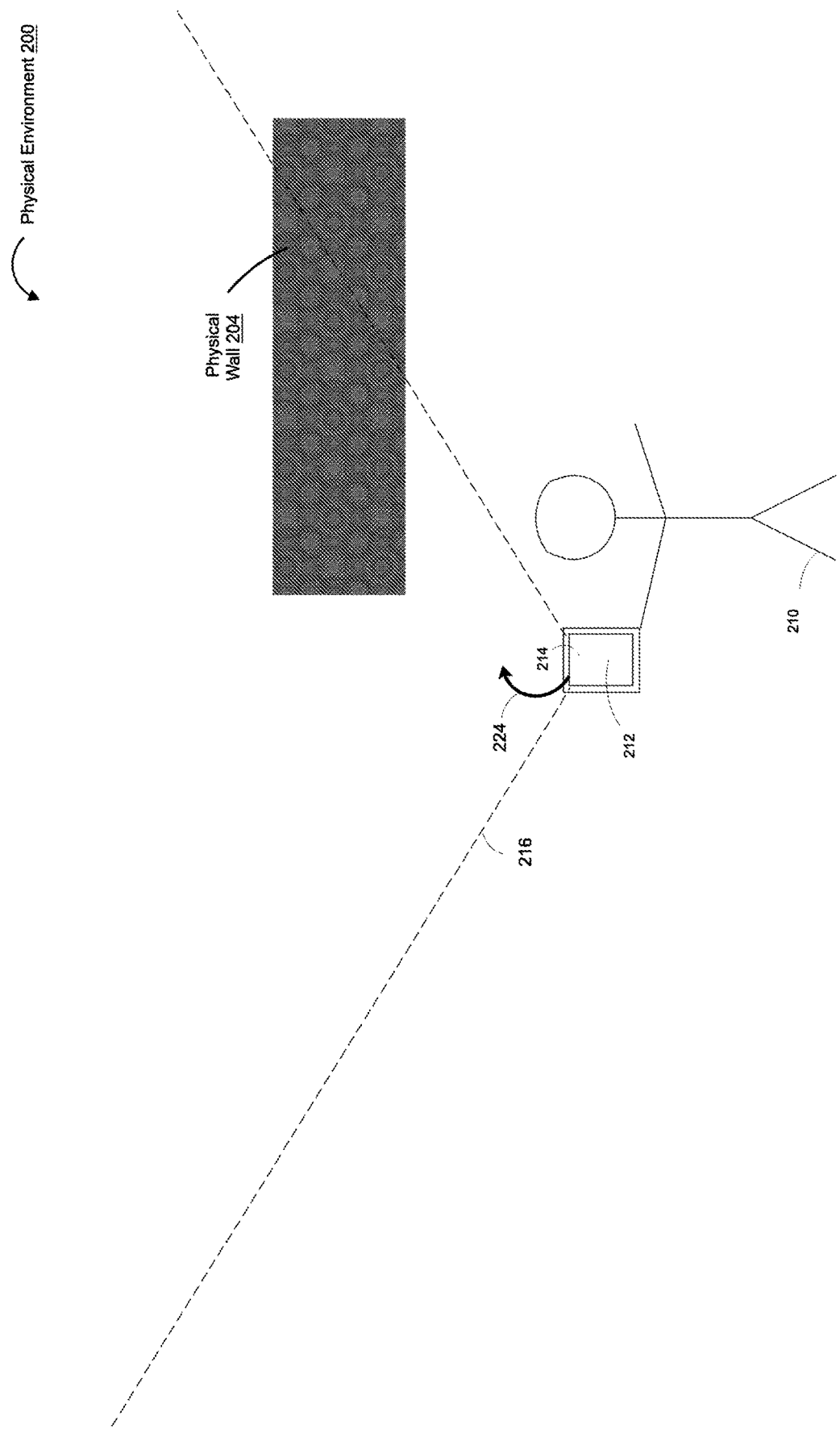

COLOR CORRECTION BASED ON PERCEPTUAL CRITERIA AND AMBIENT LIGHT CHROMATICITY

CROSS-REFERENCE TO RELATED APPLICATIONS

This application is a continuation of Intl. Patent App. No. PCT/US2021/038099, filed on Jun. 18, 2021, which claims priority to U.S. Provisional Patent App. No. 63/054,738, filed on Jul. 21, 2020, which are both hereby incorporated by reference in their entirety.

TECHNICAL FIELD

The present disclosure relates to color correction, and in particular, performing color correction with respect to a see-through display.

BACKGROUND

In some augmented reality (AR) environments, computer-generated content is added to light from a physical environment in order to enable display of the computer-generated content and a representation of the physical environment on a see-through display. A user may experience AR by wearing a head-mountable device (HMD) that includes the see-through display, which, in turn, allows the light from the physical environment to pass to eyes of the user.

In some circumstances, light from the physical environment has a luminance or a chromaticity that interferes with computer-generated content in a manner that degrades the AR experience. However, previously available color correction techniques do not effectively account for light from the physical environment.

SUMMARY

In accordance with some implementations, a method is performed at an electronic device with one or more processors, a non-transitory memory, and a see-through display. The method includes determining a chromaticity value associated with ambient light from a physical environment. The chromaticity value quantifies the ambient light. The method includes determining a set of color correction values based on a function of the chromaticity value and image data. The set of color correction values and the chromaticity value together satisfy one or more perceptual criteria. The method includes modifying the image data in order to generate display data based on a function of the set of color correction values. The method includes displaying the display data on the see-through display.

In accordance with some implementations, an electronic device includes one or more processors, a non-transitory memory, and a see-through display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 2A-2J are an example of an electronic device performing color correction based on perceptual criteria and chromaticity values associated with ambient light from a physical environment in accordance with some implementations.

SUMMARY

Figure 1:
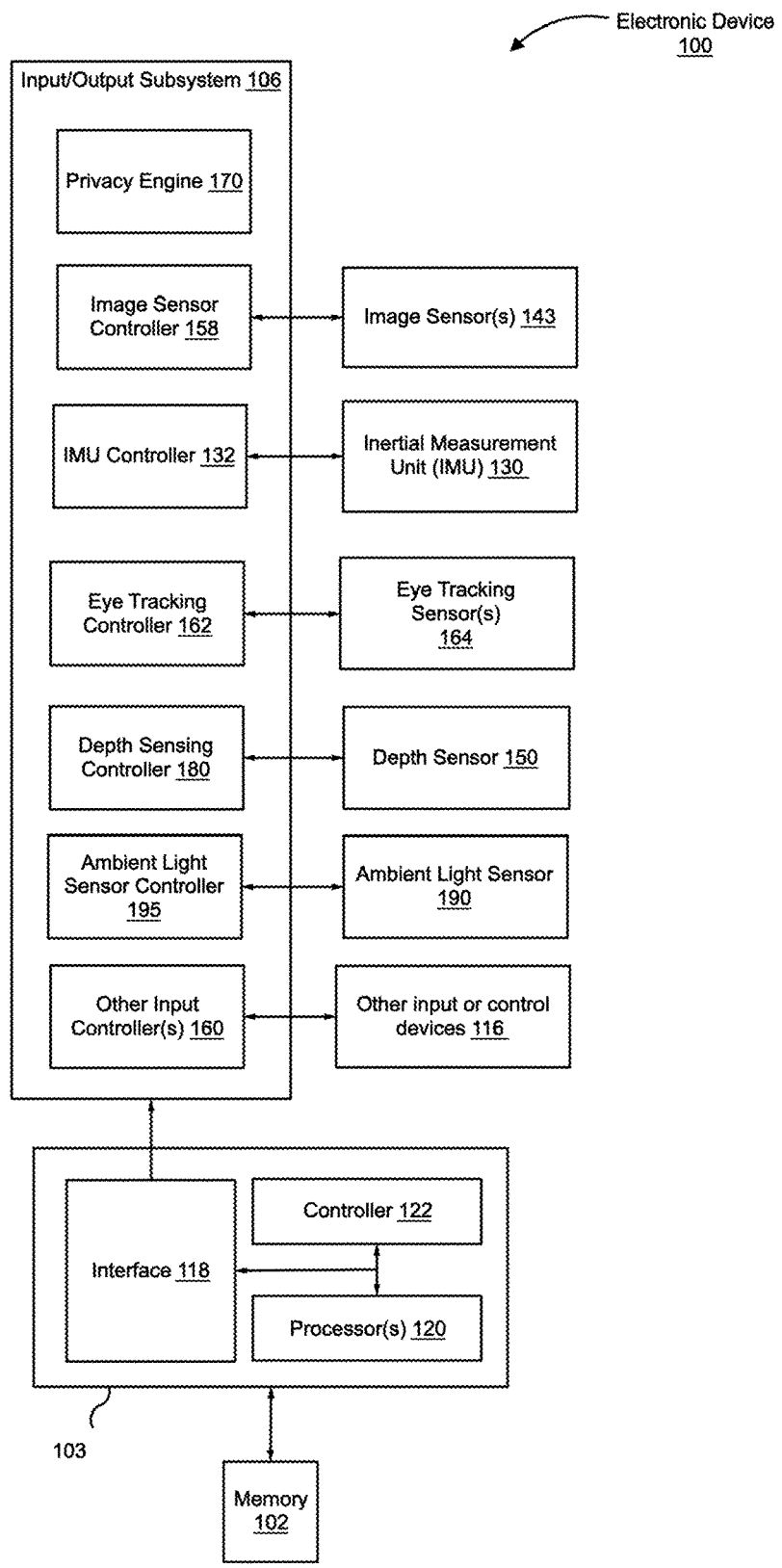
FIG. 1 is a block diagram of an example of an electronic device in accordance with some implementations.

A user may experience augmented reality (AR) by wearing a head-mountable device (HMD) that includes a see-through display, which, in turn, allows light from a physical environment to pass to eyes of the user. For example, the see-through display projects computer-generated content to be reflected off of the see-through display to the user's eyes. As another example, the see-through display projects computer-generated content directly at retinas of the user, and the light from the physical environment and the projected light of the computer-generated content concurrently reach the retinas. However, the HMD cannot effectively perform color correction because the HMD does not account for light from the physical environment. For example, light from the physical environment may have a chromaticity that interferes with computer-generated content in a manner that degrades the AR experience. The chromaticity of the light, such as the presence of predominantly one color, may provide dominant hues that are difficult to mask. The dominant hues associated with the light from the physical environment may interfere with the color characteristics of displayed computer-generated content. Moreover, certain color correction methods that are used in pass-through video display systems, such as spatially varying backlight tinting, are not readily applicable to the see-through display. Additionally, applying previously available tone mapping is not effective because it does not account for luminance or chromaticity features associated with the light.

By contrast, various implementations disclosed herein include methods, electronic devices, and systems for performing perceptual-based color correction based on chromaticity values that quantify ambient light from a physical environment. To that end, an electronic device, including a see-through display, determines the chromaticity values. For example, in some implementations, the electronic device includes one or more environment sensors (e.g., an ambient light sensor or image sensor) that sense the ambient light and output corresponding sensor data, and the electronic device determines the chromaticity values based on the corresponding sensor data.

The electronic device determines a set of color correction values based on a function of the chromaticity values and image data (e.g., computer-generated content to be displayed, such as AR content). The set of color correction values and the chromaticity value together satisfy one or more perceptual criteria. For example, the one or more perceptual criteria are a function of a range of colors or luminance values that is perceptible by a user, which may be affected by factors such as the user's state of adaptation of the eye, size and contour sharpness, location on the retina, etc.

Based on the set of color correction values, the electronic device modifies image data in order to generate corresponding display data for display on the see-through display. Thus, in contrast to other systems, the electronic device accounts for characteristics of the ambient light in order to perform effective color correction with respect to image data. For example, when the chromaticity values indicate a green background (e.g., the electronic device is pointing at trees in a real-world forest) and the image data is characterized by a predominately green hue, the set of color correction values modifies the image data in order to generate display data that is a different color than green.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 is a block diagram of an example of an electronic device 100 in accordance with some implementations. The electronic device 100 includes memory 102 (which optionally includes one or more computer readable storage mediums), a memory controller 122, one or more processing units (CPUs) 120, an interface 118, an input/output (I/O) subsystem 106, an inertial measurement unit (IMU) 130, image sensor(s) 143 (e.g., a camera), a depth sensor 150, eye tracking sensor(s) 164 (e.g., included within a head-mountable device (HMD)), an ambient light sensor 190, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100 and the other input or control devices 116 with the interface 118. The I/O subsystem 106 optionally includes an image sensor controller 158, an eye tracking controller 162, and one or more input controllers 160 for other input or control devices, and a privacy engine 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of a speaker and/or audio sensor(s). The one or more buttons optionally include a push button. In some implementations, the other input or control devices 116 includes a positional system (e.g., GPS) that obtains information concerning the location and/or orientation of the electronic device 100 relative to a physical environment.

The I/O subsystem 106 optionally includes a speaker and audio sensor(s) that provide an audio interface between a user and the electronic device 100. Audio circuitry receives audio data from the interface 118, converts the audio data to an electrical signal, and transmits the electrical signal to the speaker. The speaker converts the electrical signal to human-audible sound waves. Audio circuitry also receives electrical signals converted by an audio sensor (e.g., a microphone) from sound waves. Audio circuitry converts the electrical signal to audio data and transmits the audio data to the interface 118 for processing. Audio data is, optionally, retrieved from and/or transmitted to the memory 102 and/or RF circuitry by the interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The I/O subsystem 106 optionally includes a touch-sensitive display system that provides an input interface and an output interface between the electronic device 100 and a user. A display controller may receive and/or send electrical signals from/to the touch-sensitive display system. The touch-sensitive display system displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system has a touch-sensitive surface, sensor, or set of sensors that accepts input from the user based on haptic and/or tactile contact. The touch-sensitive display system and the display controller (along with any associated modules and/or sets of instructions in the memory 102) detect contact (and any movement or breaking of the contact) on the touch-sensitive display system and converts the detected contact into interaction with user-interface objects (e.g., one or more soft keys, icons, web pages or images) that are displayed on the touch-sensitive display system. In an example implementation, a point of contact between the touch-sensitive display system and the user corresponds to a finger of the user or a stylus.

The touch-sensitive display system optionally uses LCD (liquid crystal display) technology, LPD (light emitting polymer display) technology, or LED (light emitting diode) technology, although other display technologies are used in other implementations. The touch-sensitive display system and the display controller optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system.

The user optionally makes contact with the touch-sensitive display system using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The I/O subsystem 106 includes an inertial measurement unit (IMU) controller 132 that controls (e.g., manages operations of) the inertial measurement unit (IMU) 130. The IMU 130 may include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like. The IMU 130 may include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a monochrome or color camera. In some implementations, the image sensor(s) 143 includes an RGB depth (RGB-D) sensor.

The I/O subsystem 106 optionally includes contact intensity sensors that detect intensity of contacts on the electronic device 100 (e.g., a touch input on a touch-sensitive surface of the electronic device 100). The contact intensity sensors may be coupled with an intensity sensor controller in the I/O subsystem 106. The contact intensity sensor(s) optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) receive contact intensity information (e.g., pressure information or a proxy for pressure information) from the physical environment. In some implementations, at least one contact intensity sensor is collocated with, or proximate to, a touch-sensitive surface of the electronic device 100. In some implementations, at least one contact intensity sensor is located on the back of the electronic device 100.

The electronic device 100 includes a depth sensing controller 180 that controls (e.g., manages operations of) the depth sensor 150. In some implementations, the depth sensor 150 is configured to obtain depth data, such as depth information characterizing an object within an obtained input image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The electronic device 100 includes an ambient light sensor controller 195 that controls (e.g., manages operations of) the ambient light sensor (ALS) 190. The ALS 190 detects ambient light from a physical environment. In some implementations, the ambient light sensor 190 is a color light sensor. In some implementations, the ambient light sensor 190 is a two-dimensional (2D) or a three-dimensional (3D) light sensor.

In various implementations, the electronic device 100 includes a privacy engine 170 that includes one or more privacy setting filters associated with user information, such as user information included in the eye gaze data and/or body position data associated with a user. In some implementations, the privacy engine 170 selectively prevents and/or limits the electronic device 100 or portions thereof from obtaining and/or transmitting the user information. To this end, the privacy engine 170 receives user preferences and/or selections from the user in response to prompting the user for the same. In some implementations, the privacy engine 170 prevents the electronic device 100 from obtaining and/or transmitting the user information unless and until the privacy engine 170 obtains informed consent from the user. In some implementations, the privacy engine 170 anonymizes (e.g., scrambles or obscures) certain types of user information. For example, the privacy engine 170 receives user inputs designating which types of user information the privacy engine 170 anonymizes. As another example, the privacy engine 170 anonymizes certain types of user information likely to include sensitive and/or identifying information, independent of user designation (e.g., automatically).

FIGS. 2A-2J are an example of an electronic device 212 performing color correction based on perceptual criteria and chromaticity values associated with ambient light from a physical environment 200 in accordance with some implementations. In various implementations, the features described with reference to FIGS. 2A-2J are performed by the electronic device 100 illustrated in FIG. 1.

The electronic device 212 includes a see-through display 214. In some implementations, the electronic device 212 corresponds to a mobile device, such as a smartphone, wearable device, tablet, head-mountable device (HMD), etc. In some implementations, the see-through display 214 corresponds to an additive display that enables optical see-through of the physical environment 200, such as an optical HMD (OHMD). For example, in contrast to pure compositing using a video stream, the additive display is capable of reflecting projected images off of the display while enabling a user to see through the display.

Figure 2A:
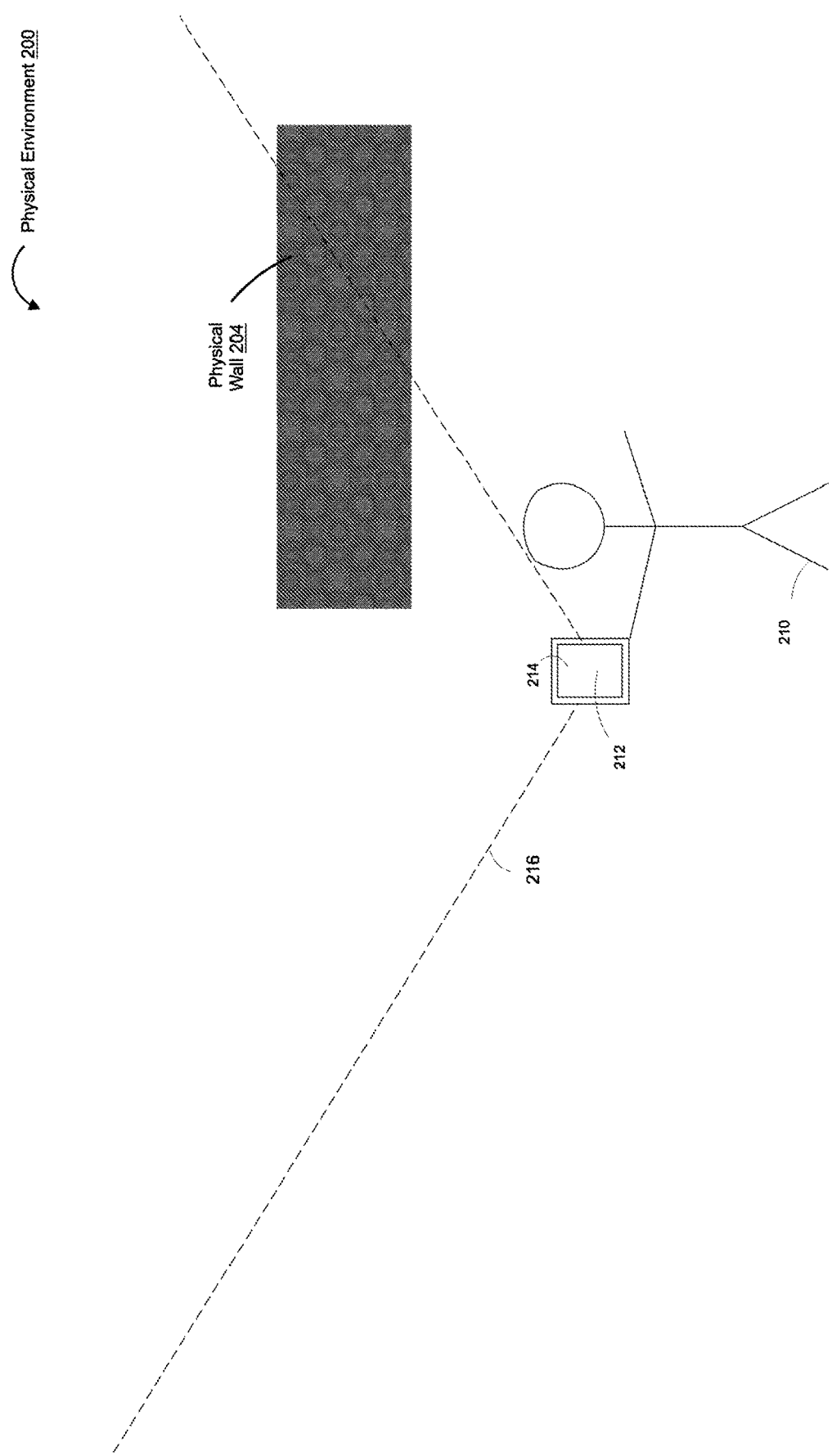

As illustrated in FIG. 2A, the electronic device 212, being held by a user 210, includes the see-through display 214. The see-through display 214 is associated with a field-of-view 216 that includes a portion of a physical environment 200. The portion of the physical environment 200 includes a portion of a physical wall 204. Accordingly, as illustrated in FIG. 2B, the see-through display 214 includes a representation of the portion of the physical wall 204 (sometimes herein referred to as "the physical wall 204" for the sake of brevity).

As illustrated in FIG. 2C, the electronic device 212 determines a first chromaticity value 217 that is associated with the physical wall 204 and a second chromaticity value 218 that is associated with a region of the see-through display 214 outside of the physical wall 204. For example, the first chromaticity value 217 indicates that the physical wall 204 has a green hue because green light reflects off of the physical wall 204 and enters the see-through display 214. The green hue is indicated by a first pattern (e.g., hatch pattern) of the physical wall 204 in FIG. 2C. The second chromaticity value 218 indicates a neutral color because of an absence of physical objects, and the neutral color is indicated in FIG. 2C by a white color (e.g., no pattern).

In some implementations, the electronic device 212 includes one or more environmental sensors that sense ambient light from the physical environment 200. The one or more environmental sensors output corresponding sensor data, such as ambient light data. The electronic device 212 may determine the first chromaticity value 217 and the second chromaticity value 218 based on the corresponding sensor data. In some implementations, the one or more environmental sensors include a combination of an ambient light sensor (ALS) (e.g., a two-dimensional (2D) sensor), an image sensor, and/or an inertial measurement unit (IMU). For example, in some implementations, the one or more environmental sensors include a monochrome or color camera with a depth sensor (RGB-D) and determines camera pose to point-of-view projection based on data from the RGB-D.

Figure 2D:
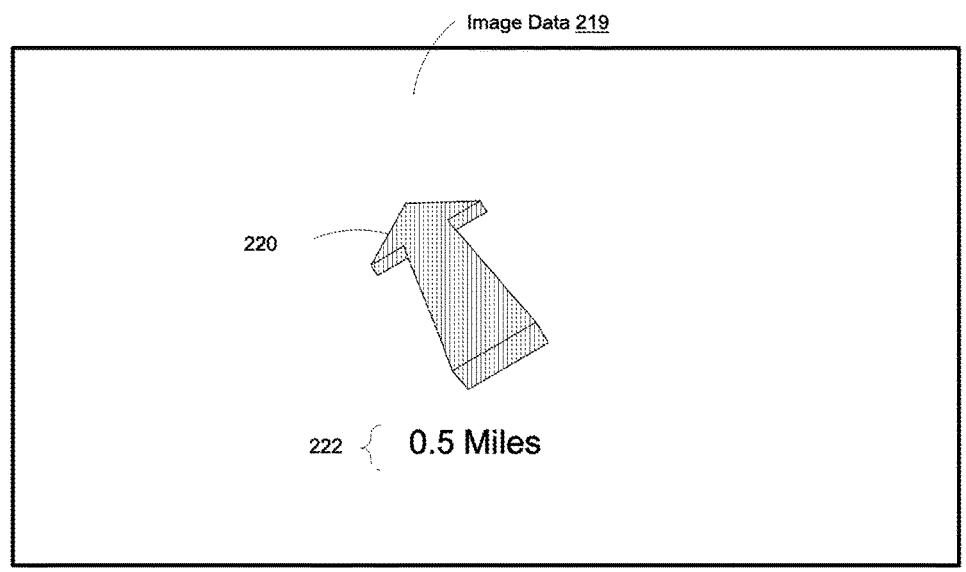
Figure 2D:
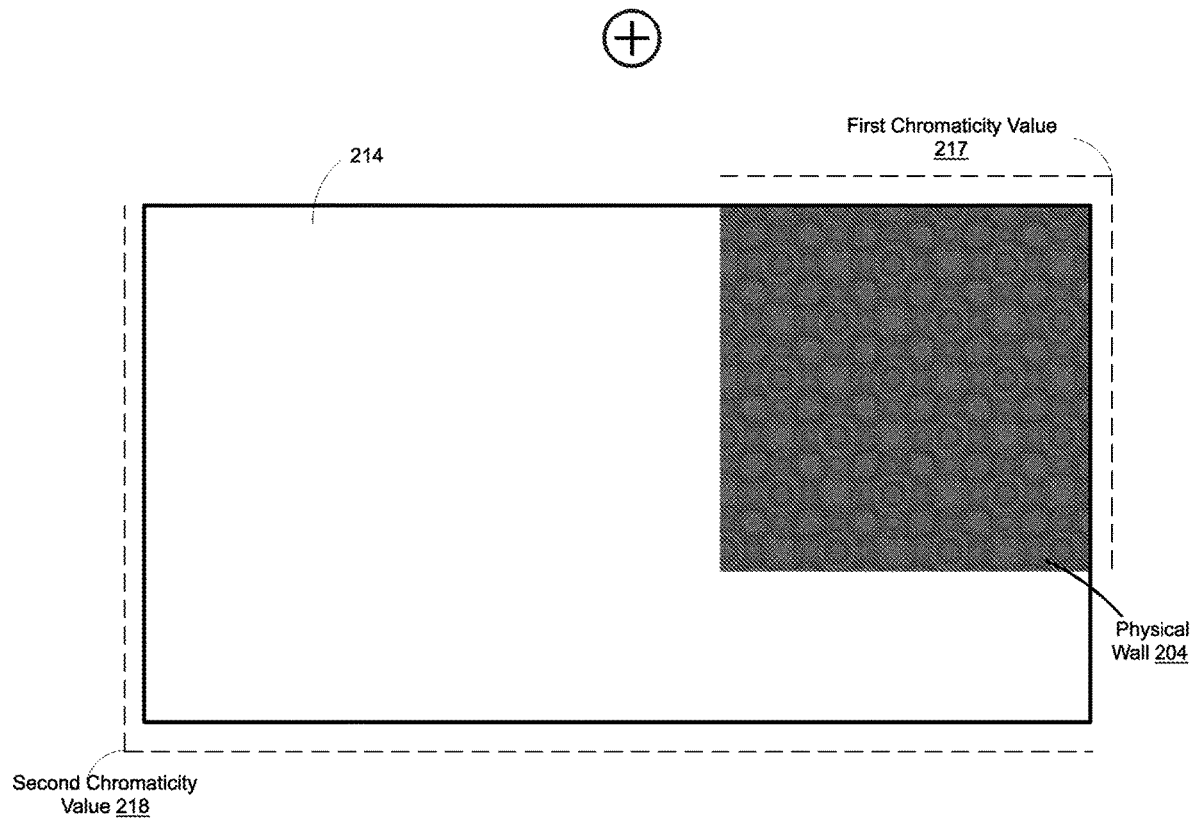

As illustrated in FIG. 2D, image data 219 is added to the see-through display 214 in order to provide the user 210 an augmented-reality (AR) experience, as is indicated by the plus sign. The image data 219 is associated with a navigation application (e.g., a GPS-based application). Namely, the image data 219 represents a directional indicator 220 that indicates a direction the user 210 should move in order to reach a destination, and a distance indicator 222 indicates the distance ("0.5 Miles") to the destination. For example, the directional indicator 220 is yellow, as is indicated by a second pattern that is different from the first pattern associated with the physical wall 204. Moreover, the distance indicator 222 is black. One of ordinary skill in the art will appreciate that, in some implementations, the image data 219 is associated with different content, associated with different application types, such as a content editing application, measuring application, furniture placement application, etc. In some implementations, the image data 219 is characterized by a plurality of sequential images, such as a video stream.

Figure 2E:
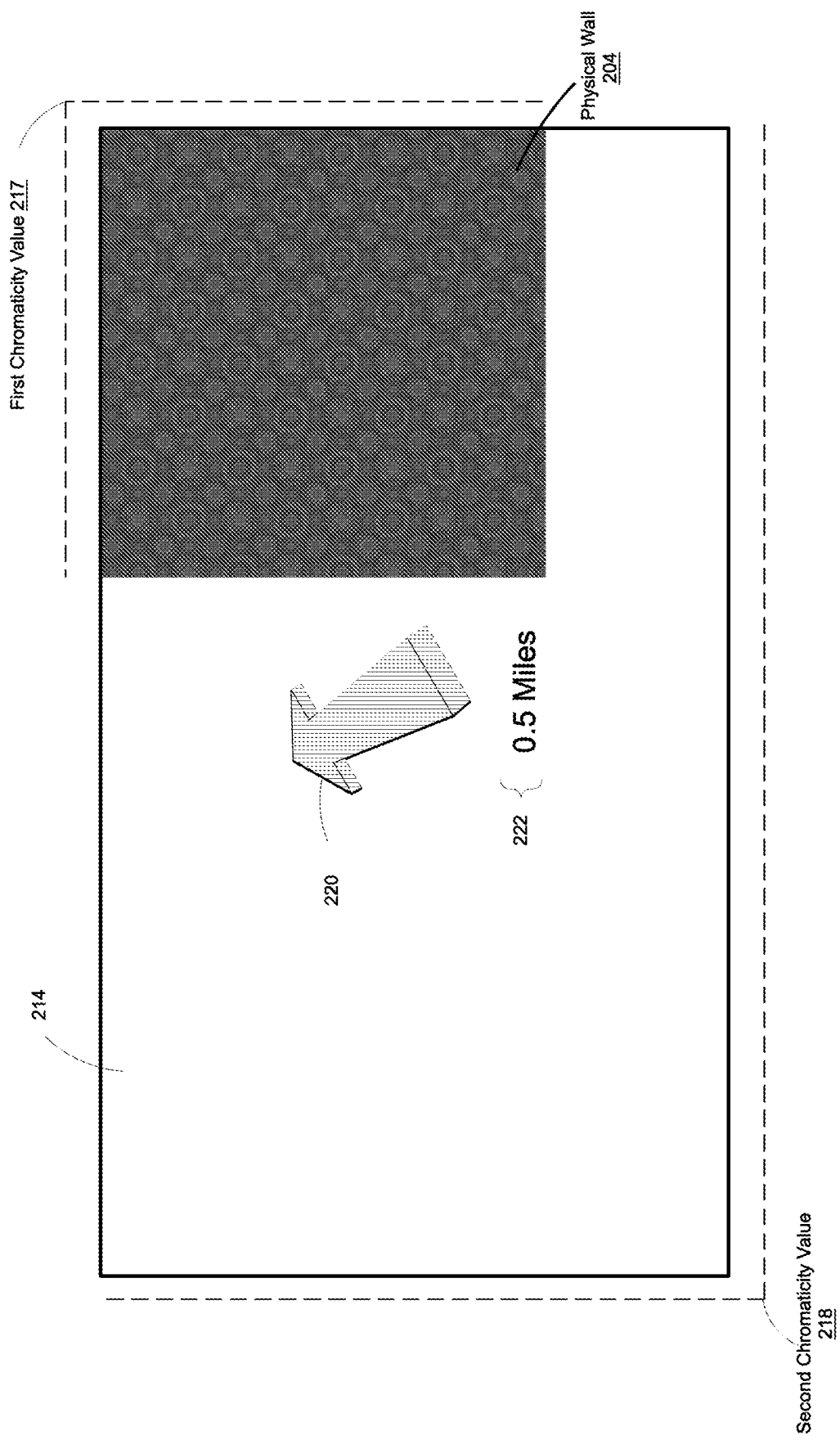

As illustrated in FIG. 2E, the electronic device 212 renders the image data 219 for display on the see-through display 214. Accordingly, the see-through display 214 includes the directional indicator 220 and the distance indicator 222. The directional indicator 220 and the distance indicator 222 are displayed within a region of the see-through display 214 that is outside of the physical wall 204. Accordingly, ambient light reflected off of the physical wall 204 (e.g., green light) does not adversely affect the appearance of the directional indicator 220 and the distance indicator 222. Accordingly, as illustrated in FIG. 2E, the directional indicator 220 displayed on the see-through display 214 maintains the second pattern. Moreover, the distance indicator 222 displayed on the see-through display 214 maintains the black appearance.

Figure 2G:
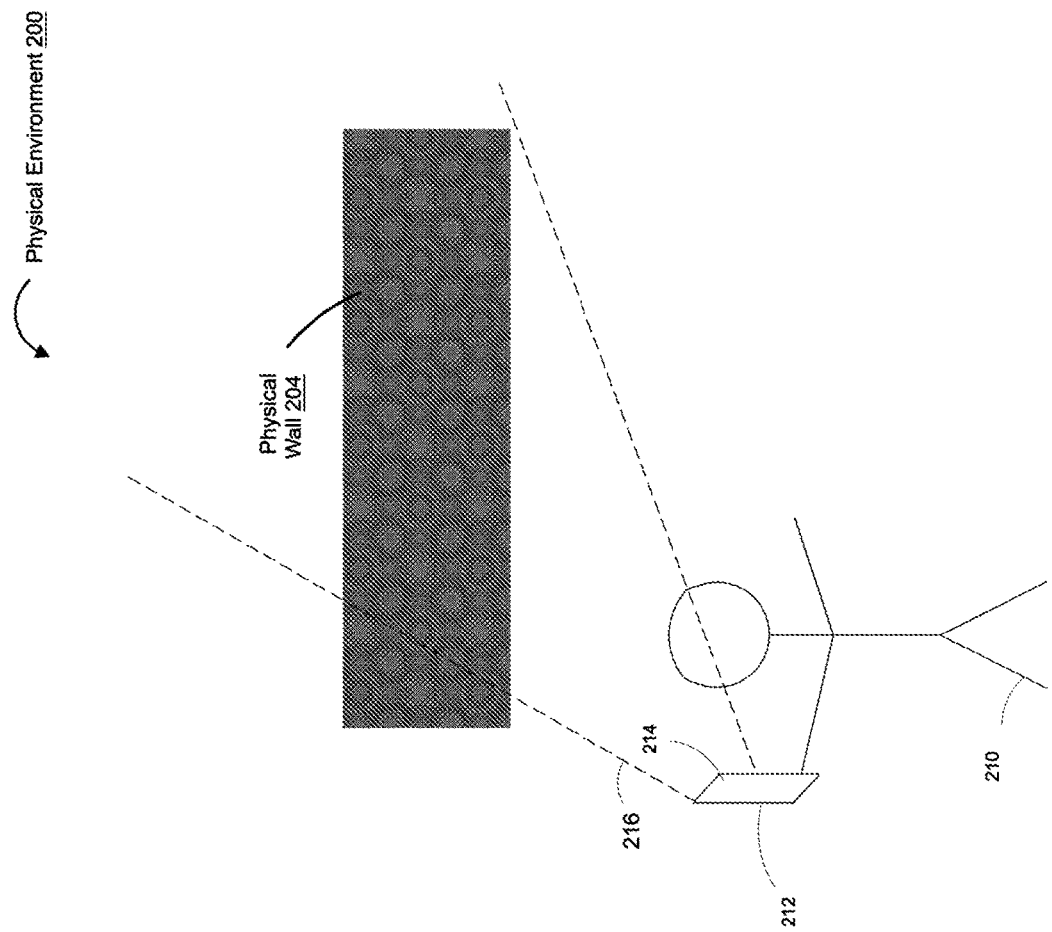

As illustrated in FIG. 2F, the electronic device 212 detects (e.g., via the IMU 130) a positional change input 224. For example, the positional change input 224 is initiated by the user 210 turning the electronic device 212 towards the physical wall 204. One of ordinary skill in the art will appreciate that, in some implementations, a different type of positional change results in a positional change of the electronic device 212. In response to detecting the positional change input 224 in FIG. 2F, the field-of-view 216 correspondingly orients (e.g., rotates) more towards the physical wall 204, as illustrated in FIG. 2G.

Figure 2H:
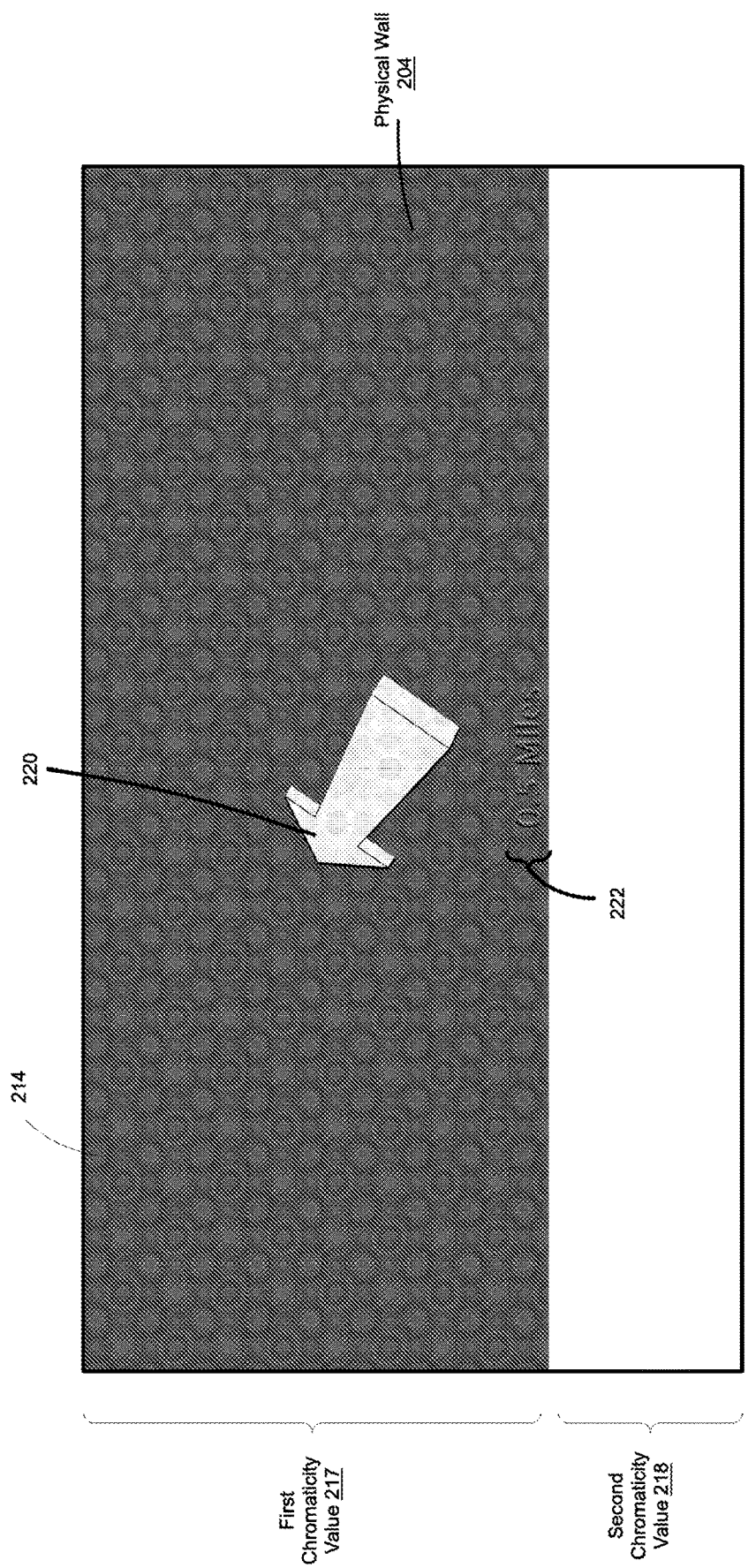

As illustrated in FIG. 2H, in response to the positional change input 224, a larger portion of the see-through display 214 includes the physical wall 204, as compared with the see-through display 214 in FIGS. 2C-2E. Accordingly, the electronic device 212 determines that the first chromaticity value 217 in FIG. 2H is associated with a larger portion (e.g., larger horizontal strip) of the see-through display 214 than the first chromaticity value 217 illustrated in FIGS. 2C-2E. Consequently, the electronic device 212 determines that the second chromaticity value 218 in FIG. 2H is associated with a smaller portion of the see-through display 214 than the second chromaticity value 218 illustrated in FIGS. 2C-2E.

Moreover, as illustrated in FIG. 2H, the directional indicator 220 and the distance indicator 222 are spatially associated with (e.g., overlap with) the physical wall 204 on the see-through display 214. Consequently, the ambient light from the physical wall 204 interferes with (e.g., mixes with) the appearance of the directional indicator 220 and the distance indicator 222. Accordingly, the directional indicator 220 in FIG. 2H has a third pattern that is different from the second pattern illustrated in FIG. 2E. For example, rather than having a yellow color, the directional indicator 220 in FIG. 2H has a greenish-yellow color because green light reflecting off of the physical wall 204 mixes with the directional indicator 220. Moreover, the distance indicator 222 appears faded in FIG. 2H, as compared with the distance indicator 222 illustrated in FIG. 2E.

Figure 2I:
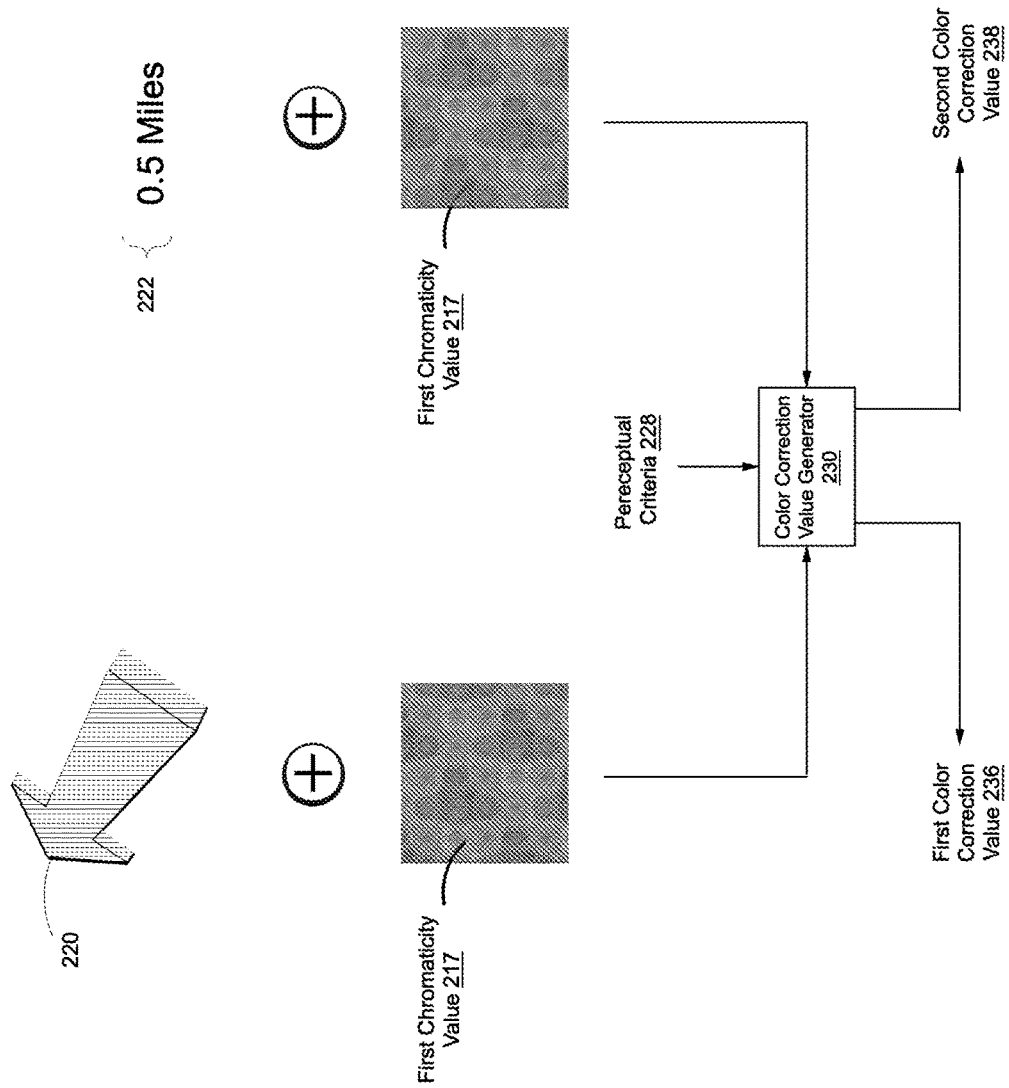

Accordingly, the electronic device 212 performs perceptual-based color correction based on chromaticity values according to various implementations disclosed herein. To that end, as illustrated in FIG. 2I, the electronic device 212 includes a color correction value generator 230. The color correction value generator 230 determines a set of color correction values based on a function of the first chromaticity value 217 and the image data 219. The set of color correction values are based on the first chromaticity value 217 because it is associated with light from the physical wall 204, and the light from the physical wall 204 adversely affects display of the directional indicator 220 and the distance indicator 222. The set of color correction values includes a first color correction value 236 that is associated with the directional indicator 220, and a second color correction value 238 that is associated with the distance indicator 222.

The set of color correction values and the first chromaticity value 217 together satisfy one or more perceptual criteria 228. In some implementations, the one or more perceptual criteria 228 are a function of a color appearance model, which provides perceptual aspects of human color vision. For example, in some implementations, the color appearance model is based on color theory. Color theory may provide an indication of colors that appear harmonious with other colors. For example, color theory may indicate harmonious colors, such as complementary colors (e.g., high contrast, opposite on the color wheel), analogous colors (e.g., close to each other on the color wheel), tetradic colors (e.g., colors spaced equally on the color wheel), and/or the like.

Figure 2J:
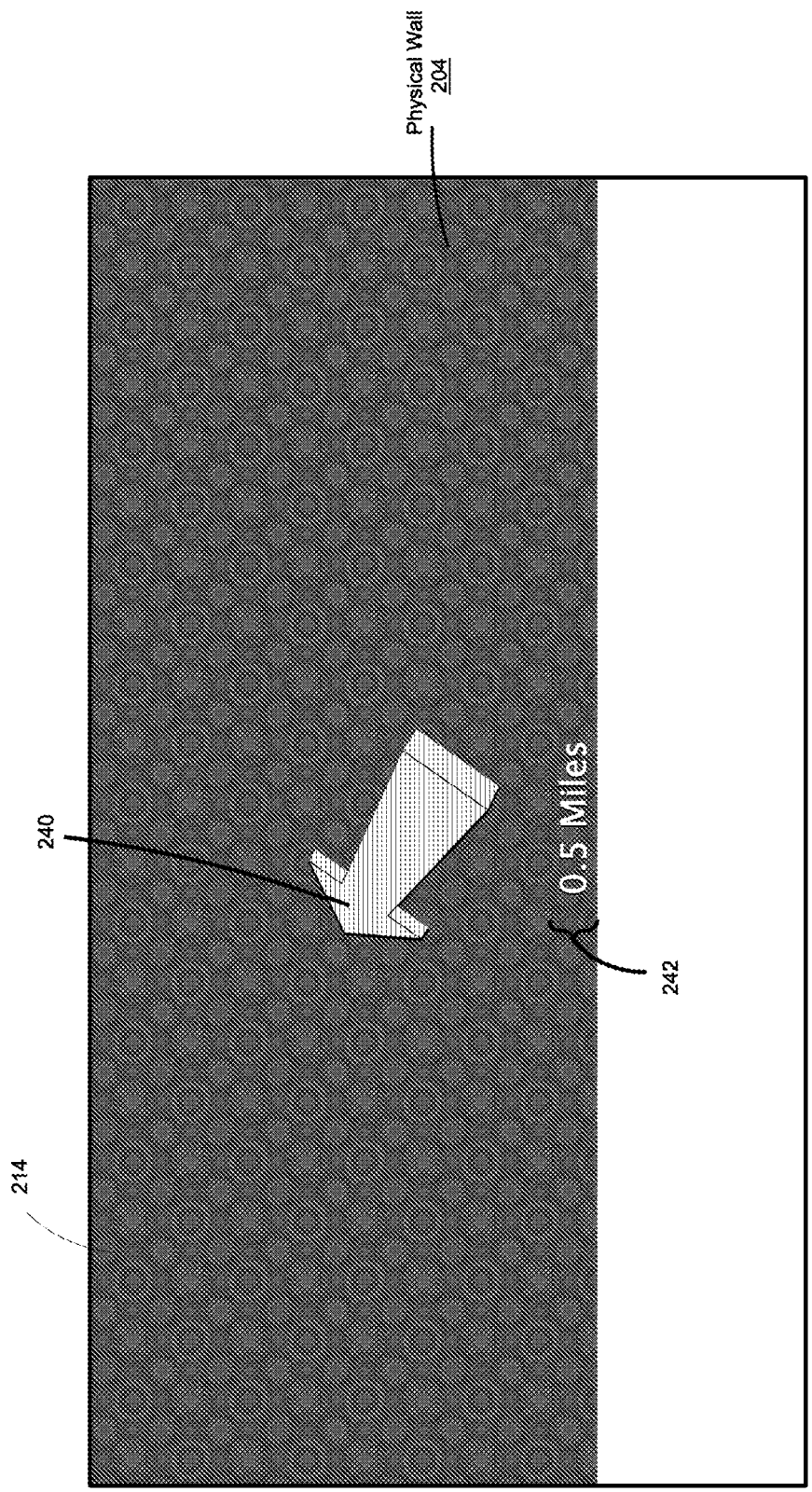

As one example, referring back to FIG. 2H, a yellow directional indicator 220 and a green physical wall 204 do not satisfy the one or more perceptual criteria 228 because the combination of yellow and green is not visually pleasing based on color theory. Thus, for example, the first color correction value 236 changes the directional indicator 220 from yellow to red, because red and green satisfy a color contrast criterion with respect to each other. Accordingly, the electronic device 212 modifies the directional indicator 220 in order to generate display data representing a color-corrected directional indicator 240, based on a function of the first color correction value 236. As illustrated in FIG. 2J, the see-through display 214 displays the color-corrected directional indicator 240. The color-corrected directional indicator 240 has a fourth pattern that is different from the third pattern (yellowish-green) and the second pattern (yellow) of the directional indicator 220, which are respectively illustrated in FIGS. 2H and 2E.

As another example, the electronic device 212 modifies the distance indicator 222 in order to generate display data representing a color-corrected distance indicator 242, based on a function of the second color correction value 238. For example, the color-corrected distance indicator 242 includes white text, as is illustrated in FIG. 2J. The white text enables greater visibility against the green background of the physical wall 204, as compared with the faded black text illustrated in FIG. 2H.

In some implementations, in response to a positional change input (e.g., the user 210 looks down), the directional indicator 220 partially overlaps with the physical wall 204 and partially overlaps with the ground. Accordingly, the electronic device 212 determines a respective chromaticity value associated with the physical wall 204 and a respective chromaticity value associated with the ground, and modifies the directional indicator 220 based on the two respective chromaticity values.

In some implementations, the electronic device 212 concurrently changes respective colors of the directional indicator 220 and the distance indicator 222. For example, in response to the positional change input 224 illustrated in FIG. 2F, the directional indicator 220 and the distance indicator 222 both overlap with the physical wall 204, and the electronic device 212 concurrently changes colors of the directional indicator 220 and the distance indicator 222 based on the overlap.

In some implementations, the electronic device 212 changes respective colors of the directional indicator 220 and the distance indicator 222 independently of each other, such as changing one color at a time but not the other. For example, in response to a positional change input, the directional indicator 220 overlaps with the physical wall 204, but the distance indicator 222 does not overlap with the physical wall 204. Accordingly, the electronic device 210 may modify the color of the directional indicator 220 in order to account for (e.g., mask out) reflected light from the physical wall 204, but does not modify the color of the distance indicator 222.

Figure 3:
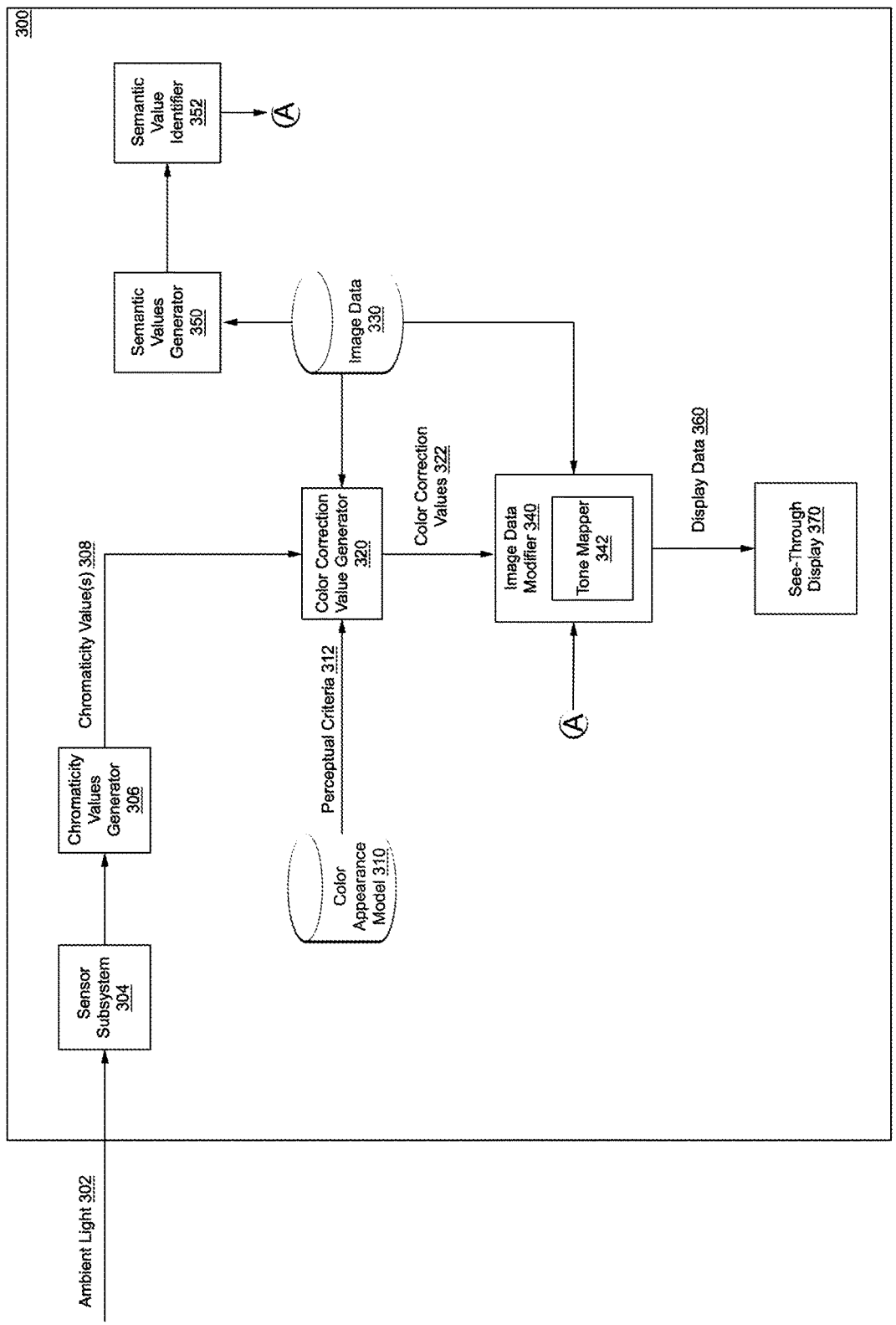
FIG. 3 is an example of a block diagram of a system that performs color correction based on perceptual criteria and chromaticity values associated with ambient light from a physical environment in accordance with some implementations.

FIG. 3 is an example of a block diagram of a system 300 that performs color correction based on perceptual criteria and chromaticity values associated with ambient light 302 from a physical environment in accordance with some implementations. In various implementations, the system 300, or portions thereof, is integrated in an electronic device with a see-through display, such as the electronic device 100 in FIG. 1 or the electronic device 212 in FIGS. 2A-2J. In some implementations, the system 300, or portions thereof, is integrated in an HMD with a see-through display.

In some implementations, the system 300 includes a sensor subsystem 304 to sense the ambient light 302 and output corresponding sensor data. In some implementations, the sensor subsystem 304 includes a combination of environmental sensors, such as an ambient light sensor (ALS) (e.g., a two-dimensional (2D) sensor), an image sensor, and/or an inertial measurement unit (IMU). For example, in some implementations, the sensor subsystem 304 includes a monochrome or color camera with a depth sensor (RGB-D) and determines camera pose to point-of-view projection based on data from the RGB-D. As another example, in some implementations, the sensor subsystem 304 captures a lower resolution scene image, such as via a dedicated low-resolution image sensor or a dedicated high-resolution image sensor. In some implementations, the sensor subsystem 304 is implemented as a hardened IP block. In some implementations, the sensor subsystem 304 is implemented by using software and hardware accelerators.

The system 300 includes a chromaticity values generator 306 that determines one or more chromaticity values 308 associated with the ambient light 302. The one or more chromaticity values 308 quantify the ambient light 302. In some implementations, the chromaticity values generator 306 determines the one or more chromaticity values 308 based on the corresponding sensor data from the sensor subsystem 304. For example, with reference to FIGS. 2E and 2H, the chromaticity values generator 306 determines the first chromaticity value 217 and the second chromaticity value 218.

The system 300 includes a color correction value generator 320 that generates a set of color correction values 322. In some implementations, the color correction value generator 320 is similar to and adapted from the color correction value generator 230 in FIG. 2I. The color correction value generator 320 generates the set of color correction values 322 based on a function of the one or more chromaticity values 308 and image data 330. The set of color correction values 322 and the one or more chromaticity values 308 together satisfy one or more perceptual criteria 312. For example, in some implementations, the one or more perceptual criteria 312 are a function of a color appearance model 310. In some implementations, the color appearance model 310 indicates certain moods or emotions that may result from a user viewing certain colors. For example, with reference to FIGS. 2I and 2J, the first color correction value 236 changes the yellow directional indicator 220 to a red directional indicator 240 because red content overlaid onto a green physical wall 204 is visually pleasing according to the color appearance model 310.

In some implementations, the system 300 includes a semantic values generator 350 that obtains or generates a plurality of semantic values respectively associated with a plurality of portions of the image data 330. For example, in some implementations, the semantic values generator 350 obtains the plurality of semantic values from another system, such as from the internet. As another example, in some implementations, the semantic values generator 350 generates the plurality of semantic values by performing semantic segmentation with respect to the image data 330. In some implementations, the semantic values generator 350 generates the plurality of semantic values with the aid of a neural network that is integrated within the system 300.

Moreover, the system 300 may include a semantic value identifier 352 that obtains the plurality of semantic values from the semantic values generator 350. In some implementations, the system 300 identifies, from the plurality of semantic values, one or more semantic values that satisfy a criterion. For example, a particular identified semantic value is associated with a portion of the image data 330 that represents an object of interest. As another example, a particular identified semantic value corresponds to a particular object type, such as a living object (e.g., a person, animal, tree, etc.). As one example, with reference to FIG. 2D, the semantic value identifier 352 identifies, within the image data 219, a first semantic value associated with the directional indicator 220, and a second semantic value associated with the distance indicator 222.

The system 300 includes an image data modifier 340. The image data modifier 340 modifies the image data 330 in order to generate display data 360 based on a function of the set of color correction values 322. In some implementations, the image data modifier 340 color maps a portion of the image data 330 in order to match a corresponding portion of the set of color correction values 322 within a performance threshold. For example, the performance threshold is a function of distortion level (e.g., minimal distortion in color or contrast), quality of color reproduction, user experience, etc.

In some implementations, the image data modifier 340 modifies a portion (e.g., a subset of pixels of a particular image) of the image data 330 based on the one or more semantic values from the semantic value identifier 352. Accordingly, by modifying less than the entirety of the image data 330, the system 300 reduces resource utilization in some circumstances.

In some implementations, the image data modifier 340 includes a tone mapper 342 that performs a tone mapping operation with respect to the image data 330. The tone mapper 342 may recover contrast that is lost in a physical environment with a non-zero luminance value. For example, the tone mapper 342 applies a tone mapping operation to a face in order to achieve a substantially uniform skin tone. In some implementations, the tone mapper 342 performs a high-dynamic range (HDR) tone mapping operation. For example, the tone mapper 342 maps colors represented within the image data 330 to the corresponding portion of the set of color correction values 322 in order to approximate the appearance of high-dynamic-range images in a medium that has a more limited dynamic range. Accordingly, the mapped image data has an improved chromaticity reproduction.

The image data modifier 340 provides the display data 360 for display on a see-through display 370. In some implementations, the see-through display 370 corresponds to the see-through display 214 described with reference to FIGS. 2A-2J.

Figure 4:
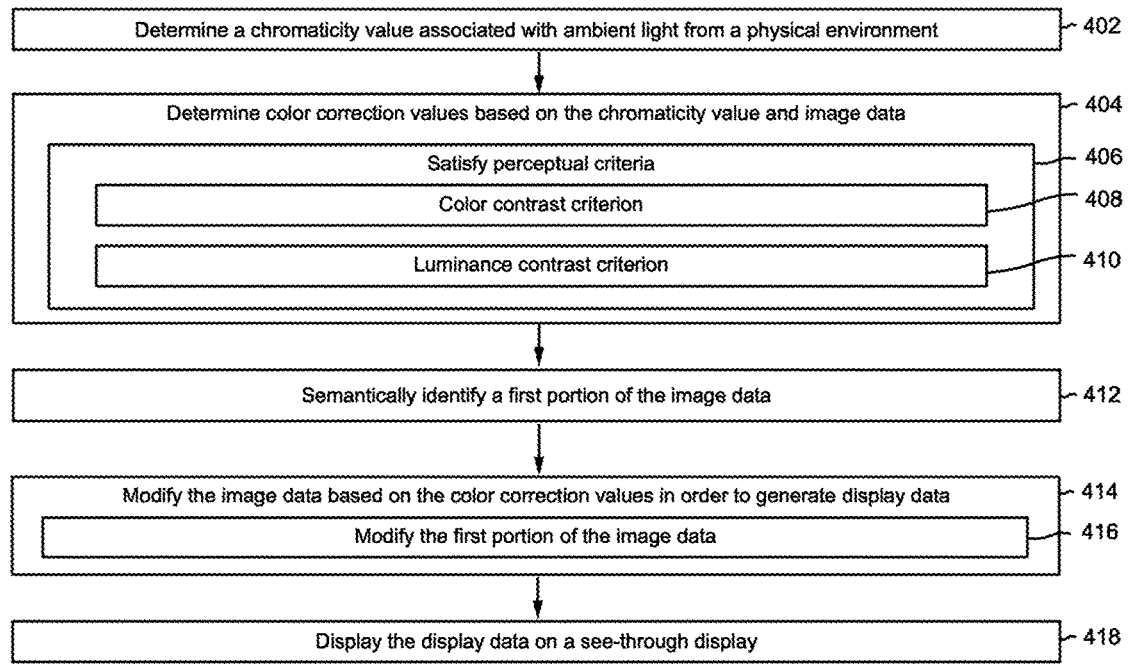
FIG. 4 is an example of a flow diagram of a method of performing color correction based on perceptual criteria and chromaticity values associated with ambient light from a physical environment in accordance with some implementations.

FIG. 4 is an example of a flow diagram of a method 400 of performing color correction based on perceptual criteria and chromaticity values associated with ambient light from a physical environment in accordance with some implementations. In various implementations, the method 400 or portions thereof are performed by an electronic device including a see-through display (e.g., the electronic device 100 in FIG. 1 or the electronic device 212 in FIGS. 2A-2J). In various implementations, the method 400 or portions thereof are performed by the system 300. In various implementations, the method 400 or portions thereof are performed by a head-mountable device (HMD) including a see-through display. In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 402, the method 400 includes determining a chromaticity value associated with ambient light from a physical environment. The chromaticity value quantifies the ambient light. In some implementations, the method 400 includes sensing (e.g., via the sensor subsystem 304 in FIG. 3) the ambient light, outputting corresponding sensor data, and using the sensor data in order to determine the chromaticity value. As one example, with reference to FIGS. 2E, 2H, and 3, the chromaticity values generator 306 determines the first chromaticity value 217 and the second chromaticity value 218. The chromaticity value may indicate a combination of hue value, chroma value, saturation value, etc. associated with the ambient light.

In some implementations, the method 400 includes determining a plurality of chromaticity values associated with the ambient light. For example, with reference to FIG. 2D, the electronic device 212 determines a first chromaticity value 217 associated with ambient light reflecting off of the physical wall 204, and a second chromaticity value 218 associated with ambient light outside of the physical wall 204. For example, each of the plurality of chromaticity values provides an objective specification of the quality of a color of a corresponding portion of ambient light entering a see-through display, irrespective of the luminance (e.g., intensity or brightness) of the ambient light.

As represented by block 404, the method 400 includes determining a set of color correction values based on a function of the chromaticity value and image data (e.g., the image data 219 in FIG. 2D). The set of color correction values and the chromaticity value together satisfy one or more perceptual criteria. For example, the one or more perceptual criteria is a function of a range of colors or lightness values that is perceptible by a particular user, which may be affected by factors such as the user's state of adaptation of the eye, size and contour sharpness, location on the retina, etc. In some implementations, the method 400 includes determining the one or more perceptual criteria based on a function of a color appearance model, such as the color appearance model 310 illustrated in FIG. 3. A color appearance model provides perceptual aspects of human color vision, such as the extent to which viewing conditions of a color diverge from the corresponding physical measurement of the stimulus source. In some implementations, the color appearance model is associated with a CIELAB color space. In some implementations, the color appearance model indicates certain moods or emotions that may result from the viewing of certain colors. For example, with reference to FIGS. 2I and 2J, the first color correction value 236 changes the yellow directional indicator 220 to a red directional indicator 240 because red content overlaid onto a green physical wall 204 is visually pleasing according to the color appearance model.

As represented by block 408, in some implementations, the one or more perceptual criteria include a color contrast criterion. The set of color correction values and the chromaticity value satisfy the color contrast criterion with respect to each other. For example, a portion of image data, corresponding to navigational AR content, has a greenish hue. Moreover, a particular chromaticity value, which is spatially associated with the portion of the image data, indicates a green hue because the electronic device is pointed at green grass on the ground. Thus, the method 400 includes determining a color correction value that changes the navigational AR content from green to red, because red and green have a relatively high color contrast with respect to each other.

As represented by block 410, in some implementations, the method 400 includes determining a plurality of luminance values associated with the ambient light, based on ambient light sensor data from an integrated ambient light sensor. The plurality of luminance values quantifies the ambient light. The one or more perceptual criteria include a luminance contrast criterion, and the set of color correction values and the plurality of luminance values satisfy the luminance contrast criterion with respect to each other. For example, with reference to FIG. 2J, the color-corrected distance indicator 242 includes bright white text because, as compared with the green background of the physical wall 204, the bright white text has a relatively high luminance contrast. Accordingly, the relatively high luminance contrast of the color-corrected distance indicator 242 is more easily perceptible by the user 210 than is the faded distance indicator 222 illustrated in FIG. 2H.

As represented by block 412, in some implementations, the method 400 includes obtaining a plurality of semantic values respectively associated with a plurality of portions of the image data. The plurality of portions of the image data includes a first portion of the image data and a second portion of the image data. Moreover, the method 400 includes identifying a first one of the plurality of semantic values that satisfies a criterion, wherein the first one of the plurality of semantic values is associated with the first portion of the image data. For example, with reference to FIG. 3, the semantic value identifier 352 identifies a particular one of a plurality of semantic values that is associated with an object of interest (e.g., a face, text, etc.) within the image data 330. Moreover, in some implementations, the method 400 includes identifying a second one of the plurality of semantic values (associated with the second portion of the image data) that does not satisfy the criterion. In some implementations, the first portion of the image data represents an object, and the second portion of the image data represents a background relative to the object. For example, with reference to FIG. 2D, the electronic device 212 determines that the directional indicator 220 represents an object, as compared with the white background surrounding the directional indicator 220.

As represented by block 414, the method 400 includes modifying (e.g., rendering) the image data in order to generate display data based on a function of the set of color correction values. For example, with reference to FIGS. 2H-2J, the electronic device 212 modifies the image data in order to generate display data, which is displayed on the see-through display 214 in FIG. 2J. In some implementations, the electronic device 212 applies the first color correction value 236 to the directional indicator 220 in order to generate the color-corrected directional indicator 240, and applies the second color correction value 238 to the distance indicator 222 in order to generate the color-corrected distance indicator 242. As one example, when the image data represents a map with three colors (e.g., green background, blue arrow, black text), the method 400 includes changing some or all of the three colors based on a corresponding set of color correction values. As another example, in some implementations, the method 400 includes modifying the image data in order to preserve a level of color contrast between the three colors of the map. In some implementations, a physical environment includes multiple colors (e.g., a blue sky and a green tree are in the field-of-view of a display), and the method 400 includes modifying an object represented by the image data based on the multiple colors. For example, the method 400 includes modifying a yellow object represented within the image data to a different color that appears harmonious in view of the multiple colors. As represented by block 416, in some implementations, modifying the image data includes modifying the first portion of the image data, as described with reference to block 412. Moreover, in some implementations, the method 400 includes foregoing modifying the second portion of the image data. Accordingly, by selectively modifying portions of the image data, an electronic device implementing the method 400 utilizes fewer resources in some circumstances.

As represented by block 418, the method 400 includes displaying, on a see-through display, the display data. In some implementations, the see-through display corresponds to the see-through display 214 described with reference to FIGS. 2A-2J. In some implementations, the see-through display corresponds to the see-through display 370 described with reference to FIG. 3.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
   at an electronic device including one or more processors, a non-transitory memory, and a see-through display:
   determining a chromaticity value associated with ambient light from a physical environment, wherein the chromaticity value quantifies the ambient light;
   determining a set of color correction values based on a function of the chromaticity value and image data, wherein the set of color correction values and the chromaticity value together satisfy one or more perceptual criteria;
   obtaining a plurality of semantic values respectively associated with a plurality of portions of the image data, wherein the plurality of portions includes a first portion of the image data and a second portion of the image data;
   identifying a first one of the plurality of semantic values that satisfies a criterion, wherein the first one of the plurality of semantic values is associated with the first portion of the image data;
   modifying the image data in order to generate display data based on a function of the set of color correction values, wherein modifying the image data includes modifying the first portion of the image data; and
   displaying the display data on the see-through display.

2. The method of claim 1, wherein modifying the image data includes color mapping a portion of the image data in order to match a corresponding portion of the set of color correction values within a performance threshold.

3. The method of claim 1, wherein modifying the image data includes performing a tone mapping operation with respect to a portion of the image data.

4. The method of claim 3, wherein the tone mapping operation corresponds to a high-dynamic range (HDR) tone mapping operation.

5. The method of claim 1, wherein the one or more perceptual criteria include a color contrast criterion, and wherein the set of color correction values and the chromaticity value satisfy the color contrast criterion with respect to each other.

6. The method of claim 1, further comprising determining a plurality of luminance values associated with the ambient light, wherein the plurality of luminance values quantifies the ambient light, wherein the one or more perceptual criteria include a luminance contrast criterion, and wherein the set of color correction values and the plurality of luminance values satisfy the luminance contrast criterion with respect to each other.

7. The method of claim 1, further comprising determining the one or more perceptual criteria based on a function of a color appearance model.

8. The method of claim 1, wherein the electronic device includes an environmental sensor that senses the ambient light and outputs corresponding sensor data, and wherein determining the chromaticity value is based on a function of the sensor data.

9. The method of claim 1, further comprising:
   identifying a second one of the plurality of semantic values that does not satisfy the criterion, wherein the second one of the plurality of semantic values is associated with the second portion of the image data; and
   foregoing modifying the second portion of the image data.

10. The method of claim 1, wherein the first portion of the image data represents an object, and wherein the second portion of the image data represents a background relative to the object.

11. The method of claim 1, further comprising:
    determining a first chromaticity value and a second chromaticity value;
    determining a first color correction value based on a function of the first chromaticity value and the image data, wherein the first color correction value and the first chromaticity value together satisfy the one or more perceptual criteria;
    determining a second color correction value based on a function of the second chromaticity value and the image data, wherein the second color correction value and the second chromaticity value together satisfy the one or more perceptual criteria; and
    modifying the first portion of the image data based on a function of the first color correction value, and modifying the second portion of the image data based on a function of the second color correction value.

12. A system comprising:
    a chromaticity values generator to determine a first chromaticity value and a second chromaticity value associated with ambient light from a physical environment, wherein the first chromaticity value and the second chromaticity value quantifies the ambient light;
    a color correction value generator to determine a first color correction value based on a function of the first chromaticity value and image data and a second color correction value based on a function of the second chromaticity value and the image data, wherein the first color correction value and the first chromaticity value together satisfy one or more perceptual criteria and the second color correction value and the second chromaticity value together satisfy the one or more perceptual criteria;
    an image data modifier to modify a first portion of the image data based on a function of the first color correction value and a second portion of the image data based on a function of the second color correction value in order to generate display data; and a see-through display to display the display data.

13. The system of claim 12, wherein the image data modifier modifies the image data by color mapping a portion of the image data in order to match a corresponding portion of the set of color correction values within a performance threshold.

14. The system of claim 12, wherein the image data modifier includes a tone mapper to perform a tone mapping operation with respect to a portion of the image data.

15. The system of claim 14, wherein the tone mapping operation corresponds to a high-dynamic range (HDR) tone mapping operation.

16. The system of claim 12, further comprising an environmental sensor that senses the ambient light and outputs corresponding sensor data, wherein the chromaticity values generator determines the first chromaticity value and the second chromaticity value based on a function of the sensor data.

17. The system of claim 12, wherein the first chromaticity value quantifies the ambient light from a first region of the physical environment and the second chromaticity value quantifies the ambient light from a second region of the physical environment.

18. The system of claim 12, wherein modifying the first portion of the image data is further based on a function of the second color correction value.

19. The system of claim 18, wherein modifying the second portion of the image data is further based on a function of the first color correction value.

20. A non-transitory computer readable storage medium storing one or more programs, the one or more programs comprising instructions, which, when executed by an electronic device with one or processors and a see-through display, cause the electronic device to:

determine a first chromaticity value and a second chromaticity value associated with ambient light from a physical environment, wherein the first chromaticity value and the second chromaticity value quantifies the ambient light;

determine a first color correction value based on a function of the first chromaticity value and image data and a second color correction value based on a function of the second chromaticity value and the image data, wherein the first color correction value and the first chromaticity value together satisfy one or more perceptual criteria and the second color correction value and the second chromaticity value together satisfy the one or more perceptual criteria;

modify a first portion of the image data based on a function of the first color correction value and a second portion of the image data based on a function of the second color correction value in order to generate display data; and display the display data on the see-through display.

* * * * *